US006924349B2

(12) United States Patent
Lee et al.

(10) Patent No.: US 6,924,349 B2
(45) Date of Patent: Aug. 2, 2005

(54) COPOLYESTER RESIN AND ARTICLES USING THE SAME

(75) Inventors: Myoung-Ryoul Lee, Seoul (KR); Jae-Young Jeon, Seongnam-si (KR); Sung-Ho Park, Yongin-si (KR); Jong-Ryang Kim, Suwon-si (KR)

(73) Assignee: SK Chemicals Co., Ltd., Gyeonggi-Do (KR)

( * ) Notice: Subject to any disclaimer, the term of this patent is extended or adjusted under 35 U.S.C. 154(b) by 0 days.

(21) Appl. No.: 10/871,159

(22) Filed: Jun. 17, 2004

(65) Prior Publication Data

US 2004/0260054 A1 Dec. 23, 2004

(30) Foreign Application Priority Data

Jun. 23, 2003 (KR) ................................. 10-2003-0040782
Feb. 27, 2004 (KR) ................................. 10-2004-0013629

(51) Int. Cl.$^7$ .............................................. C08G 63/02
(52) U.S. Cl. .................... 528/272; 264/176.1; 264/219; 428/34.1; 428/35.7; 528/271; 528/300; 528/307

(58) Field of Search ............................... 264/176.1, 219; 428/34.1, 35.7; 528/271, 272, 300, 307

(56) References Cited

U.S. PATENT DOCUMENTS 5,686,553 A * 11/1997 Tai et al. .................... 528/194

* cited by examiner

Primary Examiner—Terressa Boykin
(74) Attorney, Agent, or Firm—Abelman Frayne & Schwab

(57) ABSTRACT

Disclosed is a copolyester resin composed mainly of terephthalic acid, ethyleneglycol, 1,4-cyclohexanedimethanol, polyethyleneglycol bisphenol-A and a multifunctional monomer. According to the current invention, the multifunctional monomer and polyethyleneglycol bisphenol-A are additionally copolymerized along with 1,4-cyclohexanedimethanol, whereby the resultant copolyester resin can have low haze and high melt viscosity and melt strength, with superior moldability due to low melt pressure. In addition, extrusion blow molded articles and profile extruded articles, such as bottles and tubes, are provided by use of the copolyester resin having superior properties.

9 Claims, 1 Drawing Sheet

FIGURE

A : terephthalic acid, ethyleneglycol and
1,4 - cyclohexanedimethanol

B : terephthalic acid, ethyleneglycol,
1,4 - cyclohexanedimethanol and
multifunctional monomer C : terephthalic acid, ethyleneglycol,
1,4 - cyclohexanedimethanol,
multifunctional monomer and
polyethyleneglycol bisphenol-A

COPOLYESTER RESIN AND ARTICLES USING THE SAME

BACKGROUND OF THE INVENTION

1. Field of the Invention

The present invention relates, in general, to copolyester resins and articles using the same, and more particularly, to a copolyester resin composed mainly of terephthalic acid, ethyleneglycol, 1,4-cyclohexanedimethanol, polyethyleneglycol bisphenol-A and a multifunctional monomer, and a molded article using the same.

2. Description of the Related Art

In recent years, a polyester resin copolymerized with 1,4-cyclohexanedimethanol has been commercially used in the fields of packaging materials, molded articles, films, etc.

In this regard, U.S. Pat. Nos. 5,340,907 and 5,681,918 disclose use of a polyester resin copolymerized with 1,4-cyclohexanedimethanol and a preparation method thereof.

The copolyester resin is generally prepared by subjecting terephthalic acid, ethyleneglycol, and 1,4-cyclohexanedimethanol to esterification and then polycondensation in the presence of a stabilizer and a catalyst.

Although melt viscosity of the thus prepared polyester resin is a level suitable for sheet molding by use of an injection process and calender rolls, it is relatively low for use in profile extrusion and extrusion blow molding of large bottles which have a predetermined cross-sectional area without the need of the calender rolls.

Likewise, U.S. Pat. Nos. 4,217,440 and 4,983,711 disclose a method of increasing melt viscosity by using an additive with a multifunctional group, such as a trifunctional group, upon extrusion blow molding. Specifically, upon preparation of a copolyester resin composed of terephthalic acid, ethyleneglycol and 1,4-cyclohexanedimethanol, a multifunctional monomer, such as trimellitic acid, pentaerythritol or the like, is used in the amount of 0.05–0.5 mol %, to increase melt viscosity. Thereby, the copolyester resin has a high molecular weight due to branching effects, and thus, is advantageous in terms of high melt viscosity. However, the above copolyester resin suffers from increased melt pressure upon molding.

With reference to FIG. 1, there is illustrated viscosity variation versus shear rate of copolyester resins. As shown in this drawing, a copolyester resin (B) containing a multifunctional monomer as an additive increases in molecular weight due to the branching effects, and hence, has viscosity in a low shear rate region, that is, melt viscosity, higher than that of a general copolyester resin (A). However, the above copolyester resin has higher viscosity than that of the general copolyester resin even in the shear rate region similar to internal conditions of an extrusion blow molding machine, whereby it increases in melt pressure upon molding. Under high melt pressure, RPM cannot increase to improve productivity and to shorten a work period, thus extending cycle time. Further, a molding temperature cannot sufficiently decrease because of a narrow molding temperature range, thereby not realizing high melt viscosity and melt strength.

SUMMARY OF THE INVENTION

Leading to the present invention, the intensive and thorough research on copolyester resins having superior properties to those of conventional copolyester resins, carried out by the present inventors aiming to avoid the problems encountered in the related art, resulted in the finding that a multifunctional monomer and polyethyleneglycol bisphenol-A are additionally copolymerized together with 1,4-hexnaedimethanol, thereby obtaining a copolyester resin having high melt viscosity and melt strength, with excellent moldability thanks to a low melt pressure.

Therefore, it is an object of the present invention to provide a copolyester resin having superior moldability to that of conventional copolyester resins.

It is another object of the present invention to provide an extrusion blow molded article using the copolyester resin.

It is still another object of the present invention to provide a profile extruded article using the copolyester resin.

To achieve the above objects, the present invention provides a copolyester resin, composed of a dicarboxylic acid component including terephthalic acid; a diol component including 10–80 mol % of 1,4-cyclohexanedimethanol, and 0.1–20 mol % of a polyethyleneglycol bisphenol-A monomer represented by Formula 1, below, with the remainder being ethyleneglycol so that a total amount of the diol component reaches 100 mol %; and 0.05–0.5 mol % of a multifunctional monomer:

Formula 1

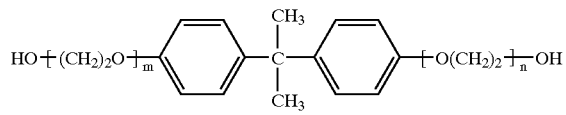

Wherein, m+n is an integer of 2–12.

Further, the present invention provides an extrusion blow molded article, including the above copolyester resin which is subjected to extrusion blow molding.

Furthermore, the present invention provides a profile extruded article, including the above copolyester resin which is subjected to profile extrusion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
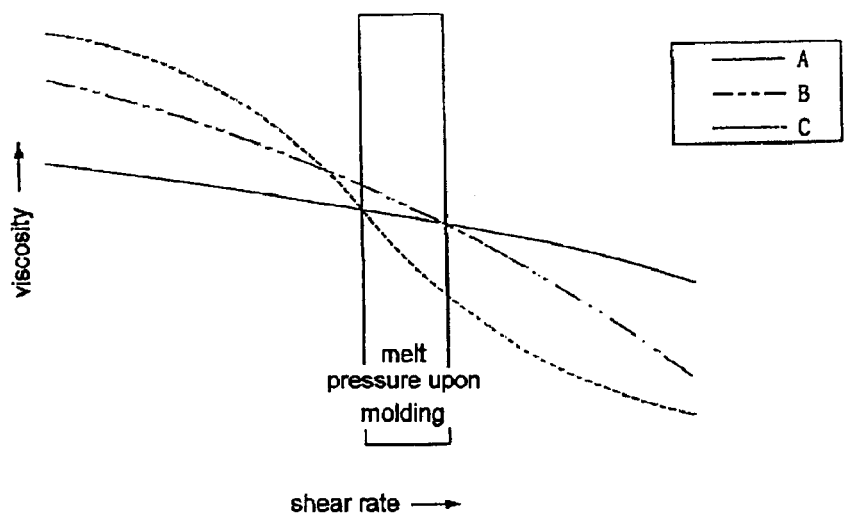
FIG. 1 is a graph showing viscosity variation versus shear rate of a copolyester resin (A) of terephthalic acid, ethyleneglycol and 1,4-cyclohexanedimethanol, a copolyester resin (B) of terephthalic acid, ethyleneglycol, 1,4-cyclohexanedimethanol and a multifunctional monomer, and a copolyester resin (C) of terephthalic acid, ethyleneglycol, 1,4-cyclohexanedimethanol, a multifunctional monomer and polyethyleneglycol bisphenol-A.

Based on the present invention, a multifunctional monomer and polyethyleneglycol bisphenol-A are additionally copolymerized upon preparation of a copolyester resin of 1,4-cyclohexanedimethanol, thereby realizing high melt viscosity and melt strength required to produce extrusion blow molded articles, such as bottles, and profile extruded articles. Further, the copolyester resin possesses low melt pressure upon molding, and hence, it can exhibit superior moldability.

The copolyester resin of the present invention results from esterification followed by polycondensation.

Upon a batch- or a continuous-type esterification, although raw materials may be separately added, for example, it is preferred that terephthalic acid is made in the form of slurry, and then added to glycol.

Specifically, a dicarboxylic acid component including terephthalic acid, a diol component including 1,4- cyclohexanedimethanol, polyethyleneglycol bisphenol-A and ethyleneglycol, and a multifunctional monomer are introduced into a reactor, and then mixed to allow their reaction while increasing temperatures.

At this time, the dicarboxylic acid component and the diol component are used so that a mole ratio of the diol component to the dicarboxylic acid component is in a range of 1.2 to 3.0. The esterification is performed at 230–260° C. under 1.0–3.0 kg/cm², but is not limited thereto. Preferably, the esterifiation is carried out at 240–260° C., and more preferably, 245–255° C., for 100–300 min. As such, the reaction time properly varies, depending on reaction temperatures and pressures, and mole ratios of the diol component to the dicarboxylic acid component.

The dicarboxylic acid component acting to improve physical properties of the copolyester resin of the present invention includes isophthalic acid, 1,4-cyclohexanedicarboxylic acid, 1,3-cyclohexanedicarboxylic acid, succinic acid, glutaric acid, adipic acid, sebacic acid and 2,6-naphthalenedicarboxylic acid, as well as terephthalic acid, but is not limited thereto.

The diol component, which is used to increase moldability or other properties of a homopolymer composed of only terephthalic acid and ethyleneglycol, is exemplified by 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol and 1,3-cyclohexanedimethanol. In particular, with the aim of increasing the properties of the homopolymer, use of 1,4-cyclohexanedimethanol is preferable.

Used in the present invention, 1,4-cyclohexanedimethanol includes a cis-isomer, a trans-isomer, or mixtures thereof, and is used in the amount similar to mol % required for a final polymer. For instance, to prevent inferior moldability due to crystallization, 10–80 mol % of 1,4-cyclohexanedimethanol is used, based on the total amount of the diol component. In addition, ethyleneglycol as another diol component is used so that the total amount of the diol component reaches 100 mol % in consideration of the amounts of 1,4-cyclohexanedimethanol and polyethyleneglycol bisphenol-A.

As for the esterification without the need of a catalyst, the catalyst may be selectively used to shorten the reaction time.

The multifunctional monomer, which serves as a cross-linking agent to increase extrusion blow molding properties and profile extrusion properties of tubes, includes trimellitic acid, trimellitic anhydride, hemimellitic acid, hemimellitic anhydride, trimesic acid, tricarballyic acid, trimethylolpropane, trimethylolethane, glycerin and pentaerythritol, but is not limited thereto.

The multifunctional monomer is used in the amount of 0.05–0.5 mol %, based on the dicarboxylic acid component. In this case, melt strength required for extrusion blow molding can be achieved, and high haze can be prevented by active cross-linkage.

Further, polyethyleneglycol bisphenol-A useful in the present invention functions to increase moldability of the copolyester resin, and is represented by Formula 1, below:

Formula 1

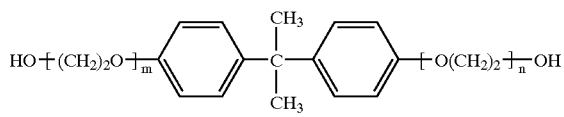

Wherein, m+n is an integer of 2–12.

As such, polyethyleneglycol bisphenol-A is preferably used in the amount of 0.1–20 mol %, thereby realizing improved properties and constantly maintained reactivity.

When the copolyester resin containing the multifunctional monomer is prepared, the addition of polyethyleneglycol bisphenol-A leads to high melt strength increased by 20% or more, and low melt pressure of 90 bar or less upon molding. As such, the melt strength results from measuring a diameter of the portion of material extruded from an extrusion blow molding machine, which is downwardly located at a distance of 100 mm from a die of the machine. Also, in cases where melt strength is 20% or more, it is possible to produce profile extruded articles and extrusion blow molded articles, such as large bottles. Moreover, a low melt pressure of 90 bar or less upon molding results in shortened cycle time due to high RPM of the molding machine, thus improving productivity. As well, since a molding temperature range is widened, the molding temperature can sufficiently decrease, whereby melt viscosity and melt strength can be further enhanced.

On the other hand, the polycondensation which takes place after the completion of the esterification, selectively requires a polycondensation catalyst, a stabilizer and a coloring agent.

Usable in the present invention, the polycondensation catalyst includes titanium-, germanium- and antimony-compounds, but is not limited thereto.

The titanium-based catalyst acts as the polycondensation catalyst of the copolyester resin which is obtained by copolymerizing 15 wt % or more of 1,4-cyclohexanedimethanol based on the weight of terephthalic acid. Such a titanium-based catalyst can be used in smaller amounts for efficient reaction, compared to antimony-based catalysts and is more inexpensive, compared to germanium-based catalysts.

Examples of the titanium-based catalyst include tetraethyltitanate, acethyltripropyltitanate, tetrapropyltitanate, tetrabutyltitanate, tetrabutyltitanate, polybutyltitanate, 2-ethylhexyltitanate, octyleneglycoltitanate, lactatetitanate, triethanolaminetitanate, acetylacetonatetitanate, ethylacetoaceticestertitanate, isostearyltitanate, titanium dioxide, coprecipitates of titanium dioxide and silicon dioxide, and coprecipitates of titanium dioxide and zirconium dioxide.

Moreover, the amount of the polycondensation catalyst to be used affects the color of the final polymer, and may vary according to desired colors and kinds of the stabilizer and coloring agent. Preferably, the polycondensation catalyst is used in the amount of 1–100 ppm of titanium element based on the weight of the final polymer, and more preferably, in the amount of 1–50 ppm of titanium element, and is used in the amount of 10 ppm or less of silicon element. Within the above range, a desired polymerization degree can be achieved, and yellowness of the final polymer is prevented.

In addition, the stabilizer and the coloring agent may be utilized.

The stabilizer includes phosphoric acid, trimethylphosphate, triethylphosphate, triethyl phosphonoacetate, etc., and for example, is added in the amount of 10–100 ppm of a phosphorus element based on the weight of the final polymer, thus obtaining a desired light color and a high polymerization degree.

Used to improve the color in the present invention, Examples of the coloring agent include cobalt acetate and cobalt propionate, and is preferably added in the amount of 0–100 ppm, based on the weight of the final polymer.

In addition to the above-mentioned coloring agent, conventionally known organic compounds may be used.

Thereby, the polycondensation is carried out at 260–290° C. under reduced pressure of 400–0.1 mmHg, but is not limited thereto.

The polycondensation is conducted for the period of time required to reach a desired intrinsic viscosity. At this time, the reaction temperature is in the range of 260–290° C., preferably 260–280° C., and more preferably 265–275° C.

Further, the polycondensation needs reduced pressure conditions of 400–0.1 mmHg to eliminate glycol produced as a by-product.

As for viscosity variation versus shear rate shown in FIG. 1, it appears that the copolyester resin (C) of the present invention which is composed of terephthalic acid, ethyleneglycol, 1,4-cyclohexanedimethanol, a multifunctional monomer and polyethyleneglycol bisphenol-A has higher melt viscosity with lower melt pressure upon molding, compared to other copolyester resins (A and B) each of which is composed of terephthalic acid, ethyleneglycol and 1,4-cyclohexanedimethanol, and terephthalic acid, ethyleneglycol, 1,4-cyclohexanedimethanol and a multifunctional monomer, respectively.

Consequently, the copolyester resin of the present invention has high melt viscosity and melt strength, with superior moldability on account of low melt pressure upon molding. Moreover, such a copolyester resin is subjected to profile extrusion or extrusion blow molding, thus obtaining desired articles.

A better understanding of the present invention may be obtained through the following examples and comparative examples which are set forth to illustrate, but are not to be construed as the limit of the present invention.

Further, physical properties shown in Examples and Comparative Examples were measured according to the following procedures.

Glass Transition Temperature (Tg): Measurement was performed by use of a Differential Scanning Calorimeter purchased from TA instrument.

Haze: Measurement was performed by use of a Haze-meter purchased from Nippon Denshoku.

Melt Viscosity: Measurement was performed through a parallel plate type in a region of shear rate (1/s)=1 by use of a Physica Rheometer purchased from Physica, USA.

Melt Strength: Measurement was performed by use of an Extrusion Blow Molding Machine purchased from Bekum, Germany. That is, while an extruding process was conducted under conditions of 20 RPM, cycle time of 17 sec, a die diameter of 30 mm, and temperatures of an extruder and the die of 195–220° C. and 190–205° C., respectively, a diameter of the portion of material extruded from the extrusion blow molding machine, which was downwardly located at a distance of 100 mm from a die of the molding machine, was determined.

The melt strength (%) was calculated according to the following equation:

$$\frac{(X-D)}{D} \times 100$$

Wherein, X is a diameter of the portion of material, which is distant from a die by 10 cm, and D is a die diameter. Thus, if X is smaller than D, the melt strength has a negative value. Meanwhile, when X is larger than D, the melt strength has a positive value.

Melt Pressure: Measurement was performed by use of an Extrusion Blow Molding Machine purchased from Bekum, Germany. 20 min after about 20 kg of a sample was introduced into the molding machine, an average value was determined when a difference between the set internal temperature and the practical internal temperature of the molding machine was less than ±1° C. and a deviation of the melt pressure was less than 4 bar.

EXAMPLE 1

Into a 3 L reactor equipped with a stirrer and a discharge condenser, 277 g of 1,4-cyclohexanedimethanol, 466 g of ethyleneglycol, 10 g of polyethyleneglycol bisphenol-A having m+n=2 in Formula 1, and 1.8 g of trimellitic acid, based on 6 mol terephthalic acid, were charged and then mixed for reaction while the temperature therein was slowly increased to 255° C.

As such, generated water was discharged to perform esterification. After completion of the generation and discharge of water, the esterification product was transferred into a polycondensation reactor equipped with a stirrer, a cooling condenser and a vacuum system.

Then, 0.5 g of tetrabutyltitanate, 0.4 g of triethylphosphate and 0.5 g of cobalt acetate were added to the product. While an internal temperature was increased from 240° C. to 275° C., ethyleneglycol was removed in a low vacuum atmosphere of 50 mmHg decreased from atmospheric pressure for 40 min. Subsequently, the pressure was slowly reduced to 0.1 mmHg to make a high vacuum atmosphere under which the reaction was performed until a desired intrinsic viscosity resulted. The reaction product was removed from the reactor and cut in chip forms.

The thus manufactured copolyester resin was measured for glass transition temperature and color. Further, the results of glass transition temperature, haze, intrinsic viscosity, melt viscosity, melt pressure and melt strength are summarized in Table 1, below.

EXAMPLE 2

A copolyester resin was manufactured in the same manner as in Example 1, with the exception that polyethyleneglycol bisphenol-A was used in the amount of 57 g. The results of glass transition temperature, haze, intrinsic viscosity, melt viscosity, melt pressure and melt strength are shown in Table 1, below.

EXAMPLE 3

A copolyester resin was manufactured in the same manner as in Example 1, with the exception that polyethyleneglycol bisphenol-A was used in the amount of 190 g. The results of glass transition temperature, haze, intrinsic viscosity, melt viscosity, melt pressure and melt strength are shown in Table 1, below.

EXAMPLE 4

A copolyester resin was manufactured in the same manner as in Example 2, with the exception that 1.2 g of trimethylolpropane was used, instead of trimellitic acid as a multifunctional monomer. The results of glass transition temperature, haze, intrinsic viscosity, melt viscosity, melt pressure and melt strength are shown in Table 1, below.

COMPARATIVE EXAMPLE 1

A copolyester resin was manufactured in the same manner as in Example 1, with the exception that polyethyleneglycol bisphenol-A was not used. The results of glass transition temperature, haze, intrinsic viscosity, melt viscosity, melt pressure and melt strength are given in Table 1, below.

COMPARATIVE EXAMPLE 2

A copolyester resin was manufactured in the same manner as in Example 1, with the exception that polyethyleneglycol bisphenol-A and trimellitic acid as a trifunctional monomer were not used. The results of glass transition temperature, haze, intrinsic viscosity, melt viscosity, melt pressure and melt strength are given in Table 1, below.

TABLE 1

| Additive | Ex. 1 Polyethylene glycol bisphenol-A 10 g + Trimellitic acid 1.8 g | Ex. 2 Polyethylene glycol bisphenol-A 57 g + Trimellitic acid 1.8 g | Ex. 3 Polyethylene glycol bisphenol-A 190 g + Trimellitic acid 1.8 g | Ex. 4 Polyethylene glycol bisphenol-A 57 g + Trimethylol propane 1.2 g | C. Ex. 1 Trimellitic acid 1.8 g | C. Ex. 2 — |
|---|---|---|---|---|---|---|
| Glass Transition Temp.(° C.) | 80.2 | 81.2 | 82.2 | 80.4 | 79.4 | 79.0 |
| Intrinsic Viscosity (dl/g) | 0.77 | 0.76 | 0.77 | 0.77 | 0.77 | 0.78 |
| Haze | ≦1.0 | ≦1.0 | ≦1.0 | ≦1.0 | ≦1.0 | ≦1.0 |
| Melt Pressure (bar) | 89 ± 4 | 87 ± 4 | 75 ± 4 | 86 ± 4 | 105 ± 4 | 94 ± 4 |
| Melt Viscosity (Pa · s)(275° C.) | 2150 | 2210 | 2730 | 2300 | 2100 | 1090 |
| Melt Strength(%) | 21.0 | 24.8 | 22.0 | 25.1 | 19 | 10.5 |

As described hereinbefore, the present invention provides a copolyester resin and an article using the same. In the present invention, polyethyleneglycol bisphenol-A is added to terephthalic acid, ethyleneglycol, 1,4-cyclohexanedimethanol, and trimellitic acid (or trimethylolpropane), whereby the resultant copolyester resin can have higher melt viscosity and melt strength, compared to conventional copolyester resins. Thus, by use of such a copolyester resin, extrusion blow molded articles, such as large bottles, and profile extruded articles can be produced. Further, the inventive copolyester resin is lower in melt pressure upon molding, compared to copolyester resins containing only a multifunctional monomer as an additive, and hence, RPM increases and cycle time shortens, therefore resulting in high productivity. In addition, since a molding temperature range becomes wide, the molding temperature can decrease, thereby further increasing melt viscosity and melt strength.

Although the preferred embodiments of the present invention have been disclosed for illustrative purposes, those skilled in the art will appreciate that various modifications, additions and substitutions are possible. Therefore, it is to be understood that within the scope of the appended claims, the invention may be practiced otherwise than as specifically described.

What is claimed is:

1. A copolyester resin, comprising:

a dicarboxylic acid component including terephthalic acid;

a diol component including 10–80 mol % of 1,4-cyclohexanedimethanol, and 0.1–20 mol % of a polyethyleneglycol bisphenol-A monomer represented by Formula 1, below, with the remainder being ethyleneglycol so that a total amount of the diol component reaches 100 mol %; and 0.05–0.5 mol % of a multifunctional monomer:

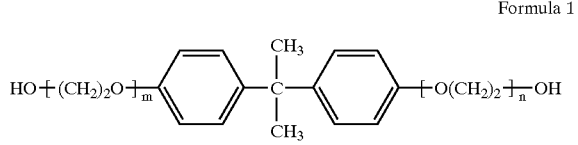

Formula 1

Wherein, m+n is an integer of 2–12.

2. The copolyester resin according to claim 1, wherein the multifunctional monomer is selected from the group consisting of trimellitic acid, trimellitic anhydride, hemimellitic acid, hemimellitic anhydride, trimesic acid, tricarballyic acid, trimethylolpropane, trimethylolethane, glycerin and pentaerythritol.

3. The copolyester resin according to claim 1, wherein the copolyester resin has melt strength not less than 20% and melt pressure not more than 90 bar.

4. An extrusion blow molded article, comprising a copolyester resin, which is subjected to extrusion blow molding, the copolyester resin including a dicarboxylic acid component including terephthalic acid;

a diol component including 10–80 mol % of 1,4-cyclohexanedimethanol, and 0.1–20 mol % of a polyethyleneglycol bisphenol-A monomer represented by Formula 1, below, with the remainder being ethyleneglycol so that a total amount of the diol component reaches 100 mol %; and 0.05–0.5 mol % of a multifunctional monomer:

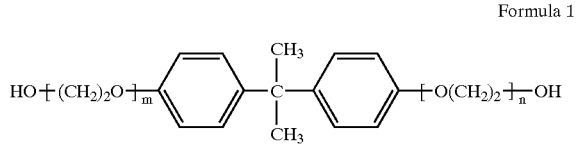

Formula 1

Wherein, m+n is an integer of 2–12.

5. The extrusion blow molded article according to claim 4, wherein the multifunctional monomer is selected from the group consisting of trimellitic acid, trimellitic anhydride, hemimellitic acid, hemimellitic anhydride, trimesic acid, tricarballyic acid, trimethylolpropane, trimethylolethane, glycerin and pentaerythritol.

6. The extrusion blow molded article according to claim 4, wherein the copolyester resin has melt strength not less than 20% and melt pressure not more than 90 bar.

7. A profile extruded article, comprising a copolyester resin, which is subjected to profile extrusion, the copolyester resin including a dicarboxylic acid component including terephthalic acid;

a diol component including 10–80 mol % of 1,4-cyclohexanedimethanol, and 0.1–20 mol % of a polyethyleneglycol bisphenol-A monomer represented by Formula 1, below, with the remainder being ethyleneglycol so that a total amount of the diol component reaches 100 mol %; and 0.05–0.5 mol % of a multifunctional monomer:

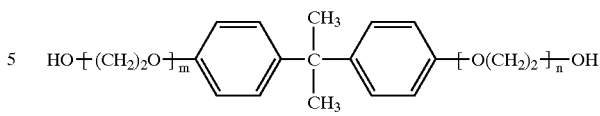

Formula 1

Wherein, m+n is an integer of 2–12.

8. The profile extruded article according to claim 7, wherein the multifunctional monomer is selected from the group consisting of trimellitic acid, trimellitic anhydride, hemimellitic acid, hemimellitic anhydride, trimesic acid, tricarballyic acid, trimethylolpropane, trimethylolethane, glycerin and pentaerythritol.

9. The profile extruded article according to claim 7, wherein the copolyester resin has melt strength not less than 20% and melt pressure not more than 90 bar.

* * * * *